(12) United States Patent
Moellenberg et al.

(10) Patent No.: US 9,948,123 B2
(45) Date of Patent: Apr. 17, 2018

(54) PORTABLE SOLAR POWER MANAGEMENT SYSTEM

(71) Applicant: WE CARE Solar, Berkeley, CA (US)

(72) Inventors: Brent Moellenberg, San Francisco, CA (US); Hal Robin Aronson, Berkeley, CA (US); David M. Miller, Berkeley, CA (US); Laura Ethel Stachel, Berkeley, CA (US)

(73) Assignee: WE CARE Solar, Berkeley, CA (US)

( * ) Notice: Subject to any disclaimer, the term of this patent is extended or adjusted under 35 U.S.C. 154(b) by 584 days.

(21) Appl. No.: 14/177,912

(22) Filed: Feb. 11, 2014

(65) Prior Publication Data

US 2015/0230306 A1     Aug. 13, 2015

(51) Int. Cl.
| | |
|---|---|
| *H02J 7/00* | (2006.01) |
| *H02J 7/35* | (2006.01) |
| *H05B 33/08* | (2006.01) |
| *H05B 37/00* | (2006.01) |

(52) U.S. Cl.
CPC .......... *H02J 7/0068* (2013.01); *H02J 7/0072* (2013.01); *H02J 7/35* (2013.01); *H05B 33/0815* (2013.01); *H05B 37/00* (2013.01); *Y10T 307/352* (2015.04)

(58) Field of Classification Search
CPC .......... H02J 7/0068; H02J 7/025; H02J 50/20; H02J 50/80; H02J 7/0072; H02J 7/35; H04W 4/008; H04W 72/0446; H05B 33/0815; H05B 37/00
USPC .......................................................... 307/24
See application file for complete search history.

(56) References Cited

U.S. PATENT DOCUMENTS

| | | | |
|---|---|---|---|
| 2009/0039705 A1* | 2/2009 | Lyman ................ | H01M 2/1022 307/64 |
| 2010/0207571 A1* | 8/2010 | English ............. | H01M 10/0525 320/101 |
| 2010/0244573 A1* | 9/2010 | Karnick .................... | H02J 7/34 307/80 |
| 2011/0163682 A1* | 7/2011 | Jungwirth .......... | H05B 33/0818 315/192 |

* cited by examiner

*Primary Examiner* — Thienvu Tran
*Assistant Examiner* — David M Stables
(74) *Attorney, Agent, or Firm* — VLP Law Group LLP; Edward Kwok

(57) ABSTRACT

A portable solar power management system includes (i) a solar panel interface to one or more solar panels, (ii) an energy storage interface to one or more energy storage devices, (iii) a charging circuit which routes the electrical currents from the solar panels to the energy storage devices; (iv) a load interface to one or more load devices, the load devices being powered independently on primary and secondary load circuits; and (v) a controller for controlling the operations of solar panel interface, the energy storage interface, the charging circuit, and the load interface. In addition, a secondary load control circuit and a programmable controller may be provided which route the electrical currents from the energy storage devices to the load interface, wherein the programmable controller, based on the sensing signals, also activates and deactivates the secondary load circuit.

24 Claims, 17 Drawing Sheets

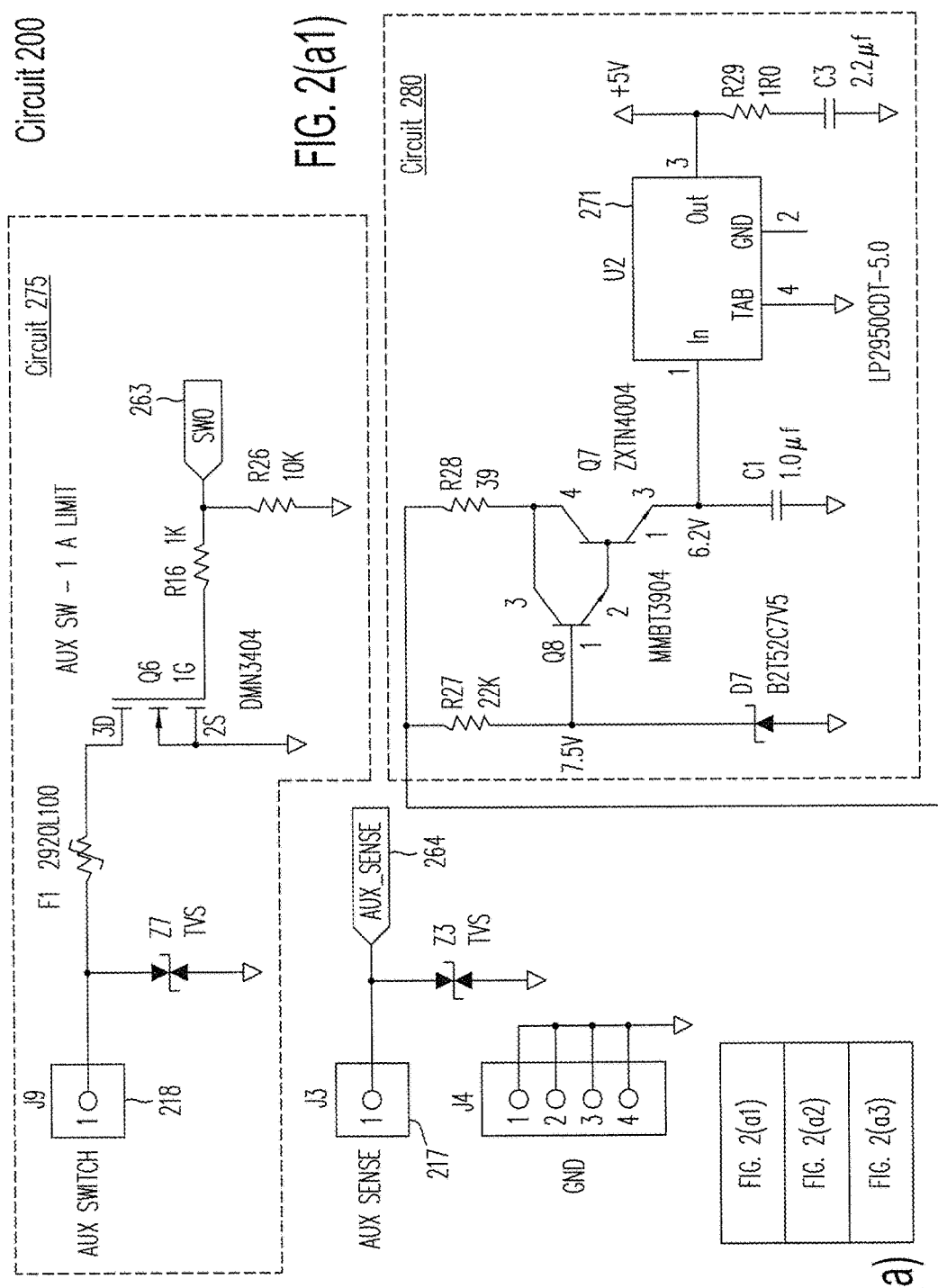

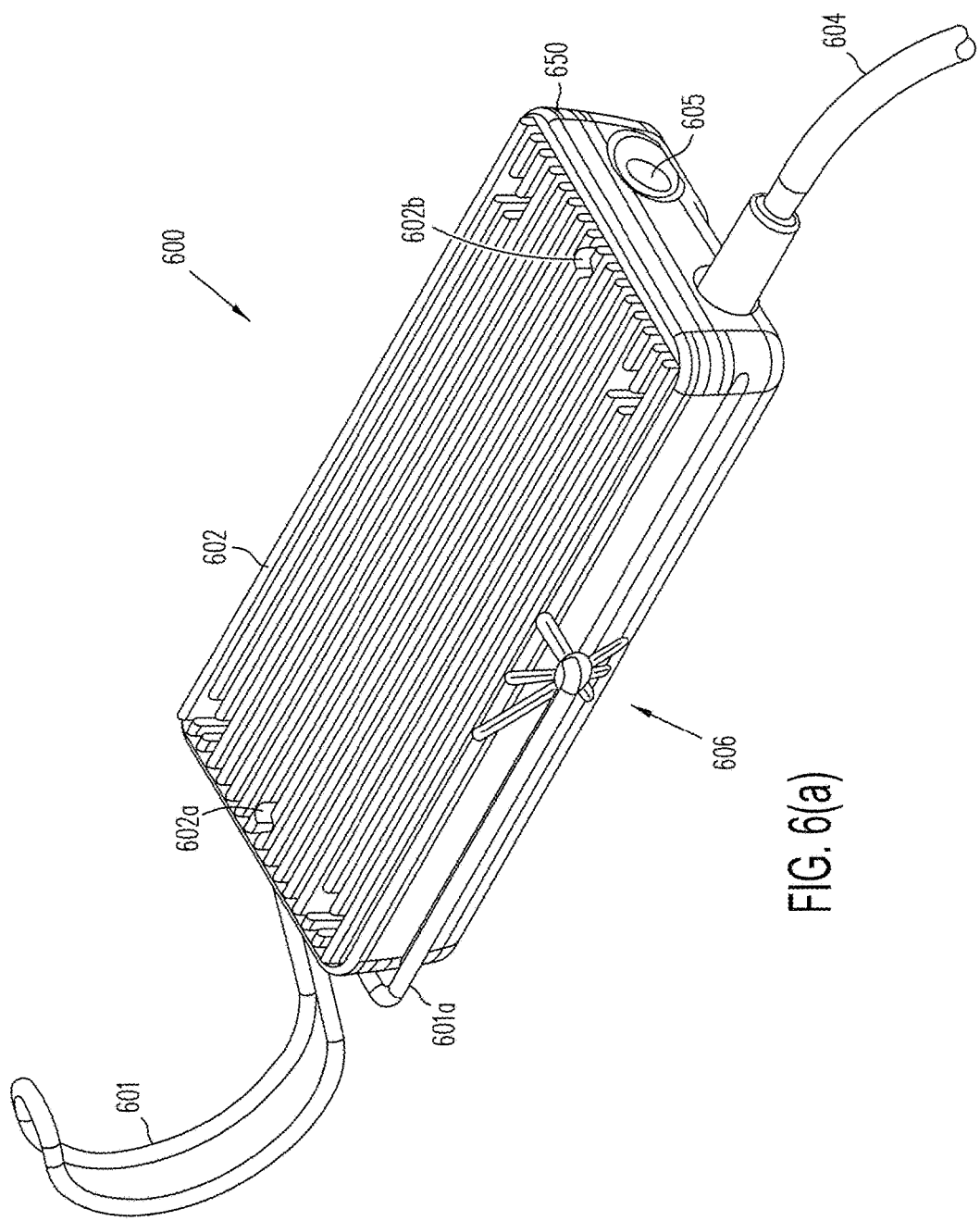

PORTABLE SOLAR POWER MANAGEMENT SYSTEM

BACKGROUND OF THE INVENTION

1. Field of the Invention

The present invention relates to a portable system for energy management; in particular, the present invention relates to a portable system for capturing and managing solar energy for use in lighting and other applications of a health care facility in a rural area.

2. Discussion of the Related Art

Many parts of the world still lack a reliable source of electricity for supporting essential health care services (e.g., mid-wife services or other emergency services) provided after dark. The required source of electricity is essential to provide adequate lighting for patient examination and power to operate simple diagnostic devices or to perform simple medical procedures. In the past, diesel or gasoline-powered local generators were often used. However, such systems are not only costly to acquire and maintain, their operations also depend on fuel being reliably accessible and available, which is often not the case. In addition, these local generation systems require some level of expertise to operate, which may not be readily available in many locations. Consequently, such local generation systems are seldom efficiently used, or are able to remain serviceable over even a significant fraction of their expected lifespan. These local generation systems also require the facility to provide infrastructure support (e.g., semi-permanent wiring), as they are not portable. Thus, the fact still remains that after-dark essential health care services are denied to many communities because of a lack of reliable source of electricity.

Therefore, there is a long-felt need for a portable power management system (e.g., one that can be transported in a protective container, such as a suitcase) that can provide adequate lighting for patient examination, and power to operate simple diagnostic devices or to perform simple medical procedures.

SUMMARY

According to one embodiment of the present invention, a power management system includes (i) a solar panel interface to one or more solar panels, the solar panel interface providing wiring for: (a) receiving solar panel sensing signal representative of a voltage in the solar panels and (b) conducting one or more electrical currents received from the solar panels; (ii) an energy storage interface to one or more energy storage devices, the energy storage interface providing wiring for: (a) receiving an energy storage sensing signal representative of a voltage in the energy storage devices and (b) conducting one or more electrical currents received from or provided to the energy storage devices; (iii) a charging circuit which routes the electrical currents from the solar panels to the wiring for conducting electrical currents received from or provided to the energy storage devices; (iv) a load interface to one or more load devices, the load interface providing wiring for: (a) receiving a load sensing signal representative of a voltage in the load devices and (b) conducting one or more electrical currents in each of a primary load circuit and a secondary load circuit; and a (v) controller for operating the solar panel interface, the energy storage interface, the charging circuit and the load interface.

According to one embodiment of the present invention, the power management system further includes (i) a programmable controller in the secondary load circuit receiving the solar panel sensing signal, the energy storage sensing signal and the load sensing signal; and (ii) a load control circuit which routes the electrical currents from the energy storage devices to the wiring for conducting electrical signals in the load interface, the load control circuit being capable of activating or deactivating the secondary load circuit independently of the primary load circuit. Based on the states of these signals, the programmable controller activates and deactivates power supplied to load devices in the secondary load circuit.

The power management system may include a housing that encloses the solar panel interface, the energy storage interface, the charging circuit, the load interface, the controller, at least one of the solar panels and at least one of the energy storage devices. In that configuration, the management system is portable. In one embodiment, the housing further encloses the programmable controller and the load control circuit. The energy storage devices may be provided by one or more lead acid batteries or lithium ion batteries. According to one embodiment of the present invention, for lithium ion batteries, the programmable controller may execute a method for waking up the battery. The method may perform the battery wake-up operation when one or more of the following conditions are satisfied: (a) the suitcase battery does not present a usable voltage; (b) the solar panel sensing signal indicates a voltage suitable for performing a charging operation on the battery; (c) previous wake-up operations have not exceed a predetermined maximum number; and (d) an elapsed time between the wake-up operation and an immediately preceding wake-up operation exceeds a predetermined time period.

In one embodiment, to ensure that priority is given to lighting, the programmable controller maintains a score relevant to determining whether to activate or to deactivate the secondary load circuit. The score may be increased when the solar panel sensing signal and the load sensing signal both indicate a favorable power condition. The score may be decreased when the solar panel sensing signal and the energy storage sensing signal together indicate an unfavorable condition for charging the energy storage devices, or when the energy storage sensing signal indicates that the energy stored in the energy storage devices is less than a predetermined value. In one instance, the secondary load circuit is activated for a predetermined time period when the score exceeds a predetermined value. In addition, the secondary load circuit may be deactivated when the energy storage sensing signal indicates that the energy stored in the energy storage devices is less than a predetermined value. Under that condition, the score is set to zero upon deactivating the secondary load circuit.

According to one embodiment of the present invention, the power management system includes one or more light emitting diode-based (LED) lights operating on the primary load circuit. In that example, each of the LED lights is capable of being dimmed in response to a control signal from the controller. In one example, the amount of dimming depends on the duty cycle of the control signal. The controller determines the duty cycle based on the solar panel sensing signal, the energy storage sensing signal and the load sensing signal. In addition, each of the LED lights is capable of being programmed to be dimmed to a predetermined minimum brightness.

The present invention is better understood upon consideration of the detailed description below, in conjunction with the accompanying drawings.

BRIEF DESCRIPTION OF THE DRAWINGS

FIGS. 6(a) and 6(b) show, respectively, back and front views of an LED light assembly 600, according to one embodiment of the present invention.

To facilitate cross-referencing among the figures, like elements are assigned like reference numerals.

DETAILED DESCRIPTION OF THE PREFERRED EMBODIMENTS

To overcome the deficiencies of the prior art, the present invention provides a portable solar power management system that receives and stores solar energy in the daytime, and which dispenses power during the day and after dark. Such a portable power management system is suitable for use at a small to medium size health center (HC) in certain parts of the developing world. Typically, such an HC may be on or off a power grid. Thus, the solar power management system may be relied upon as a primary source of energy, a back-up system, or a cost-reduction device for a room in such a facility. In this detailed description, portable solar power management systems designed for maternal and child health (MCH) applications are used to illustrate the present invention. In a MCH application, the portable solar power management system provides sufficient power for illumination and sufficient power to perform delivery services or C-sections. The present invention is, of course, not so limited. As the systems according to the present invention are portable, they can be easily transported to support emergency response after a natural disaster, or to be used in any temporary installation.

Figure 1A:
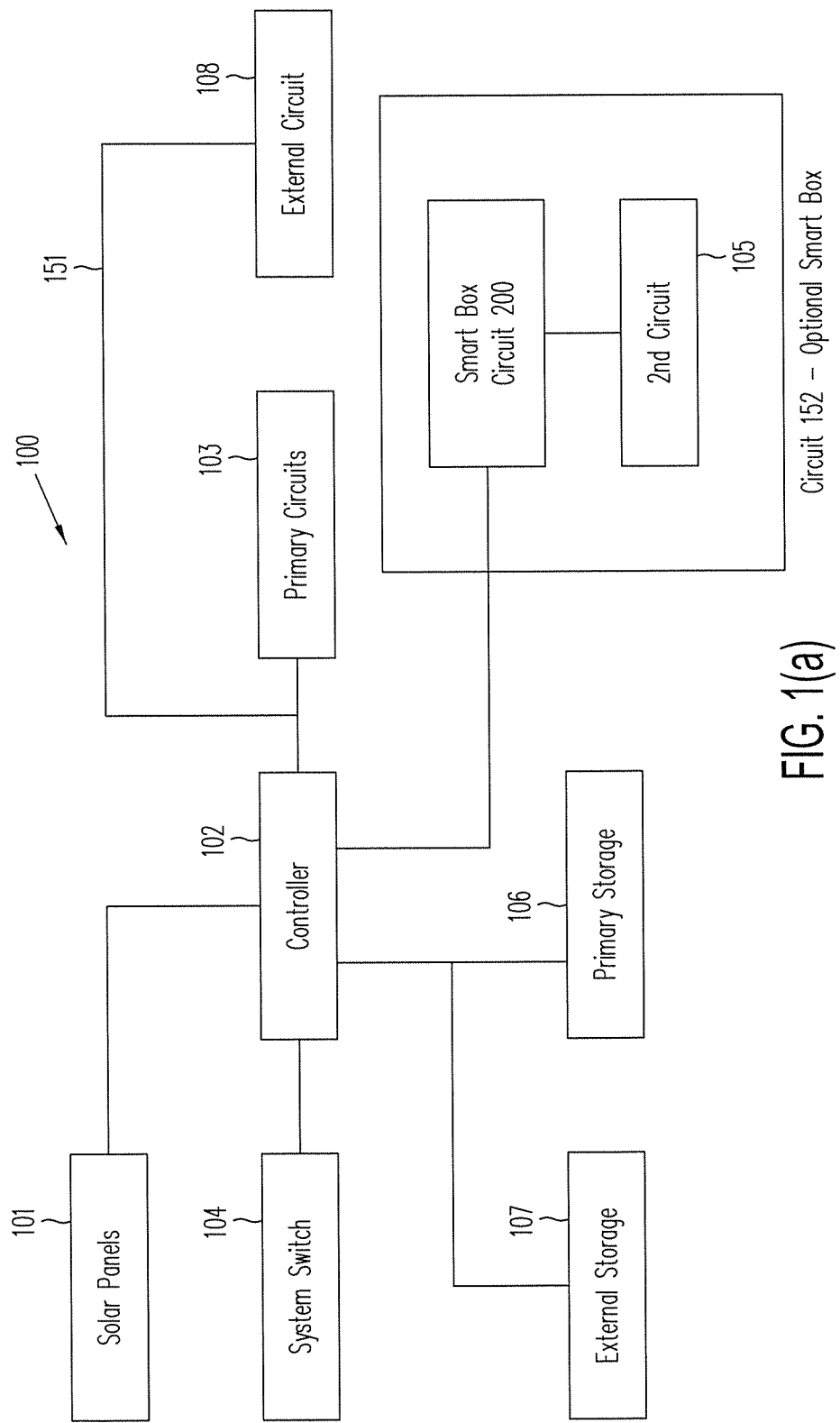
FIG. 1(a) shows a block diagram of portable power management system 100, in accordance with one embodiment of the present invention.

FIG. 1(a) shows a block diagram of portable power management system 100, in accordance with one embodiment of the present invention. Portable power management system 100 is designed to allow its components and selected accessories to be packed in a suitcase for portability. In one embodiment, the suitcase measures approximately 20 by 16 by 8 inches and weighs about 35 pounds. In general, such a suitcase may be considered portable if it can be transported manually without difficulty using no more than two average able-bodied adults. As shown in FIG. 1, portable power management system includes one or more solar panels 101 that are expected to be kept in the sunlight to capture solar power during operation and are sized to fit also in the suitcase during transportation. Each of solar panels 101 may be built out of photovoltaic cells to provide a maximum output power of approximately 20 watts, at a nominal output voltage of at least about 12 volts. Under control of controller 102, output currents of the solar panels 101 may be used to charge energy storage devices 106 and 107. In one implementation, energy storage device 106 is a battery built into the suitcase, while storage device 107 may be an optional additional battery that can be connected to portable power management system 100. Each of storage devices 106 and 107 may be a commercially available sealed lead acid battery or a lithium iron phosphate battery. These batteries also operate at approximately 12 volts. To prevent an over-voltage condition in the battery charging circuit, the input terminals of the batteries (and, hence, also the output terminals of solar panels 101) are limited by charge controller 102. When the battery is a type of lithium ion battery, a protective method to recover from battery over-discharge by "waking up" the battery may be provided, in accordance with the present invention, as illustrated in detail by flow chart 400 of FIG. 4, which is discussed in further detail below. Other batteries may also be used, with controller 102 providing suitable control of the charging process.

The power stored in the batteries is used to supply power to circuits 151 and 152. Circuit 151 is designed for supplying power to lighting. In one embodiment, circuit 151 may provide high-efficiency, rugged and water-resistant light emitting diode (LED) lights. Typically, each such light may provide very bright white spectrum light (e.g., 5400° to 5600° K) at 2-8 watts, suitable for medical procedure use. As providing lighting after dark is an important purpose for the present invention, to avoid inadvertent inappropriate use or abuse, circuit 151 supplies only sockets for special lighting connectors (e.g., M12 light connectors). In FIG. 1(a), these sockets are represented by primary circuits 103. In one embodiment, additional circuit sockets, represented by extension circuits 108, may be provided by connecting a satellite kit on which the additional sockets are mounted. The satellite kit may be used to provide lighting, for example, in an adjacent room without its own portable power management system.

Circuit 152 is provided to provide power to operate low-power electronic devices, such as handheld medical diagnostic devices, cellular telephones, and portable computers. As after-dark lighting is deemed more essential, circuit 200 is included to activate circuit 152 only when an adequate level of energy has been stored in the batteries. This operation is discussed in further detail below in conjunction with FIG. 5. Circuit 152 may supply power through various outlets of different convenient voltages, represented in FIG. 1(a) by secondary circuit 105. These power outlets may be, for example, automotive power outlets (e.g., 12 volts standard cigarette lighter sockets), 12-volt binding posts, and USB sockets. These sockets may supply power to communication or computation devices (e.g., cellular telephones, tablet or notebook computers), or medical or diagnostic equipment (e.g., portable fetal heart rate Doppler sensor, examination headlamps, blood pressure meters).

Communication devices have become increasingly useful as diagnostic devices because remote diagnostic techniques have come into greater use.

Power switch 104 is prominently located to ensure easy access should system shut down be necessary under emergency conditions.

Controller 102 also provides a user interface for communicating operational information regarding power management system 100. For example, portable power management system 100 includes LED lights to indicate battery charging and battery charge status. In addition, a liquid crystal display (LCD) panel may also be provided to indicate the current output voltage of the batteries, the charging current from solar panels 101, and the total output currents being drawn in circuits 103, 151, and 152.

Figure 1B:
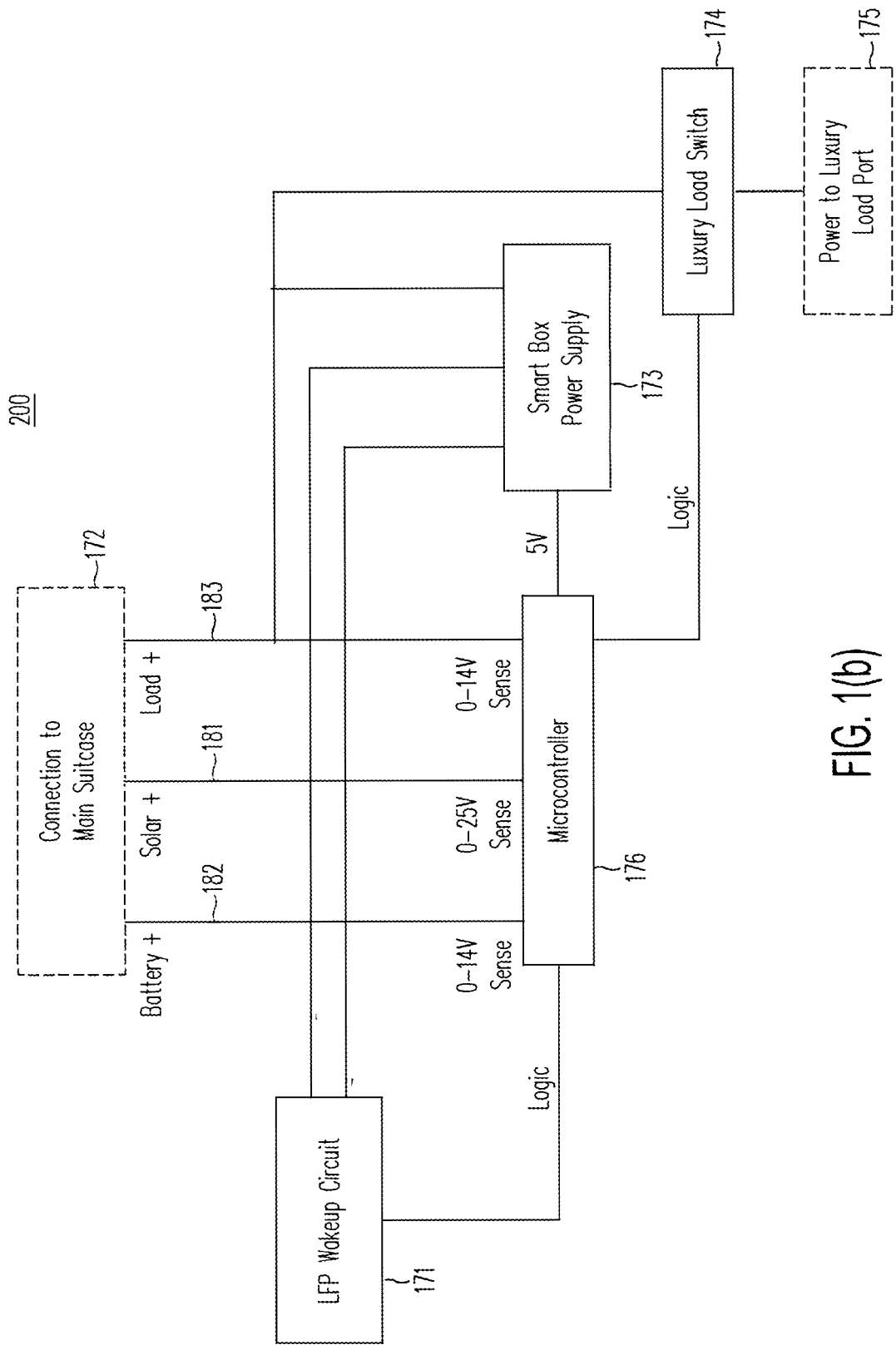
FIG. 1(b) shows a block diagram of circuit 200, which is an implementation of an optional plug-in accessory to circuit 152 of power management system 100, in accordance with one embodiment of the present invention.

In one embodiment, circuit 152 may include an optional "plug-in" accessory ("smart box") that provides control to "luxury load" and to waking-up an over-discharged lithium ion battery. FIG. 1(b) is a block diagram of circuit 200, which is an implementation of the smart box according to one embodiment of the present invention. As shown in FIG. 1(b), circuit 200 interfaces circuit 152 through connector 172, which includes solar panel sensing signal 181, battery sensing signal 182, and load sensing signal 183. In one embodiment, (i) solar panel sensing signal 181 indicates a voltage supplied by solar panels 101, which may be between 0 and 25 volts; (ii) battery sensing signal 182 indicates a voltage supplied by energy storage devices 106 or 107, which may be between 0 and 14 volts; and load sensing signal 183 indicates a voltage of load devices, which may be between 0 and 14 volts. The sensing signals are received in to microcontroller 176, which controls lithium battery wake-up circuit 171 for waking-up an over-discharged lithium battery and luxury load switch 174. Luxury load switch 174 activates circuit 152 in accordance with the load management method described below in conjunction with FIG. 5. Power supply circuit 163 provides a supply voltage to operate microcontroller 176. The operation of microcontroller 176 augments the control operations of controller 102 of FIG. 1(a).

Figure 2:
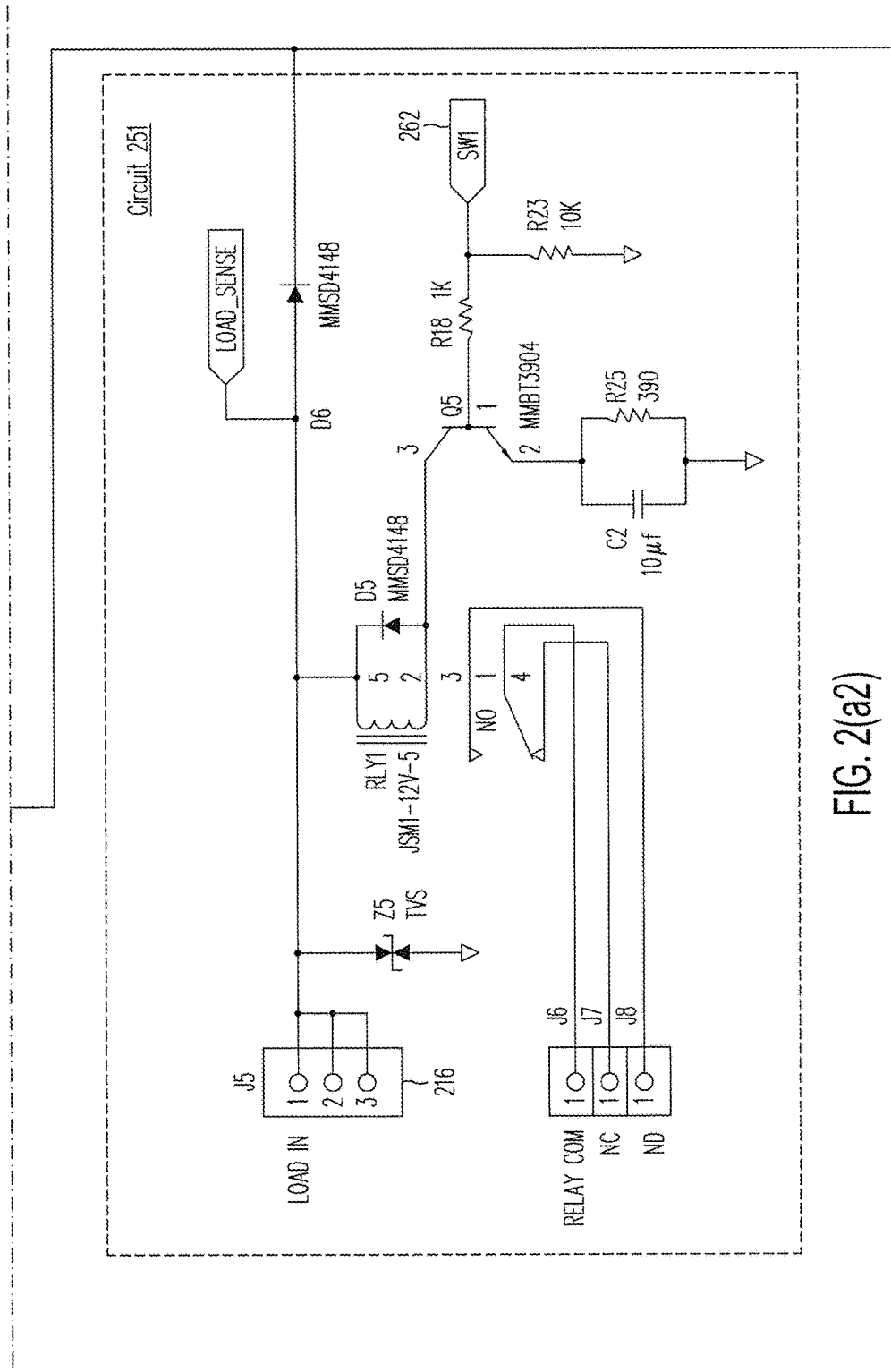
FIGS. 2(a1), 2(a2), 2(a3) and 2(b) show smart box circuit 200 in further detail schematically, in accordance with one embodiment of the present invention.
Figure 2:
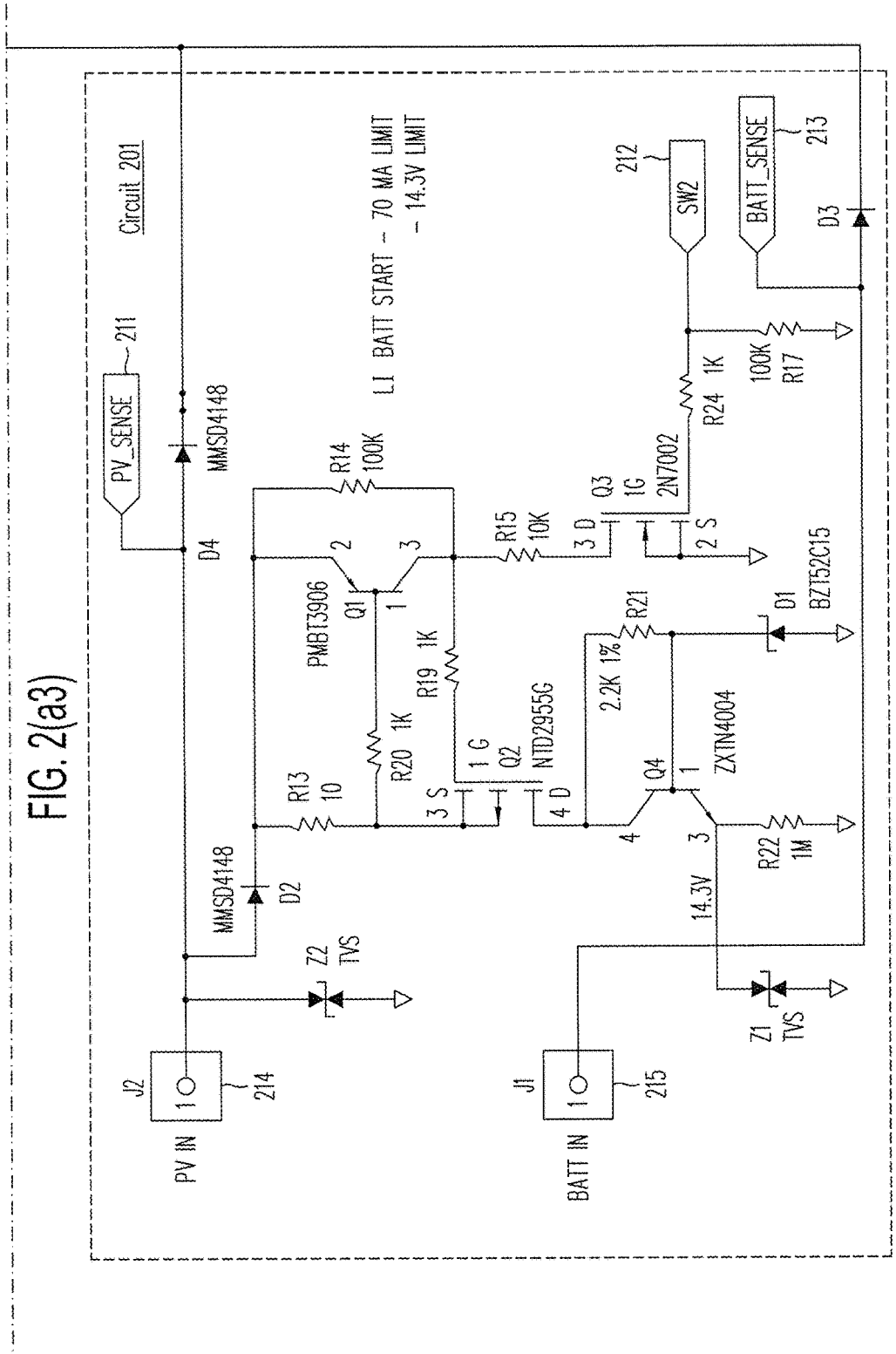
Figure 2B:
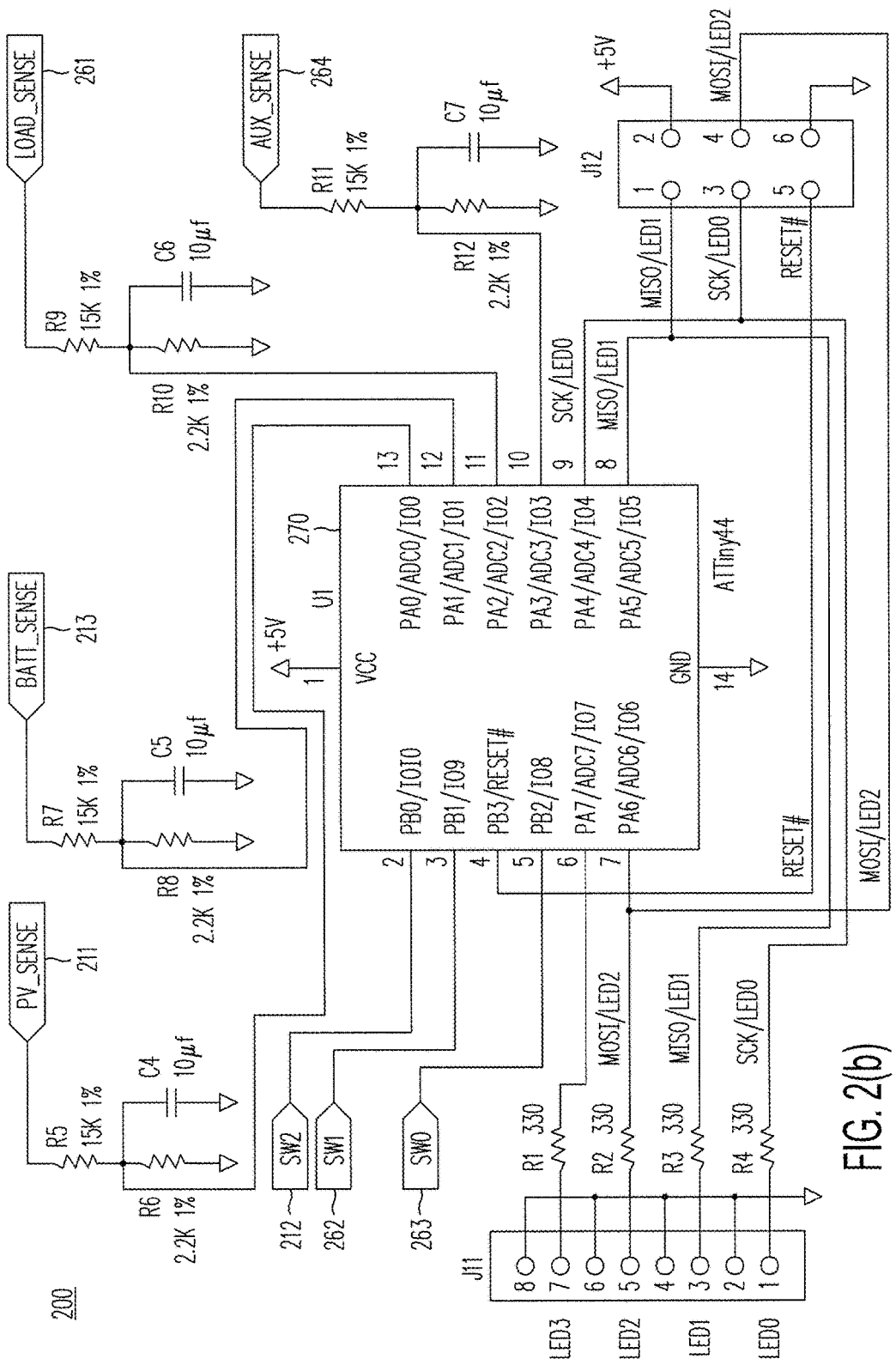
Figure 4:
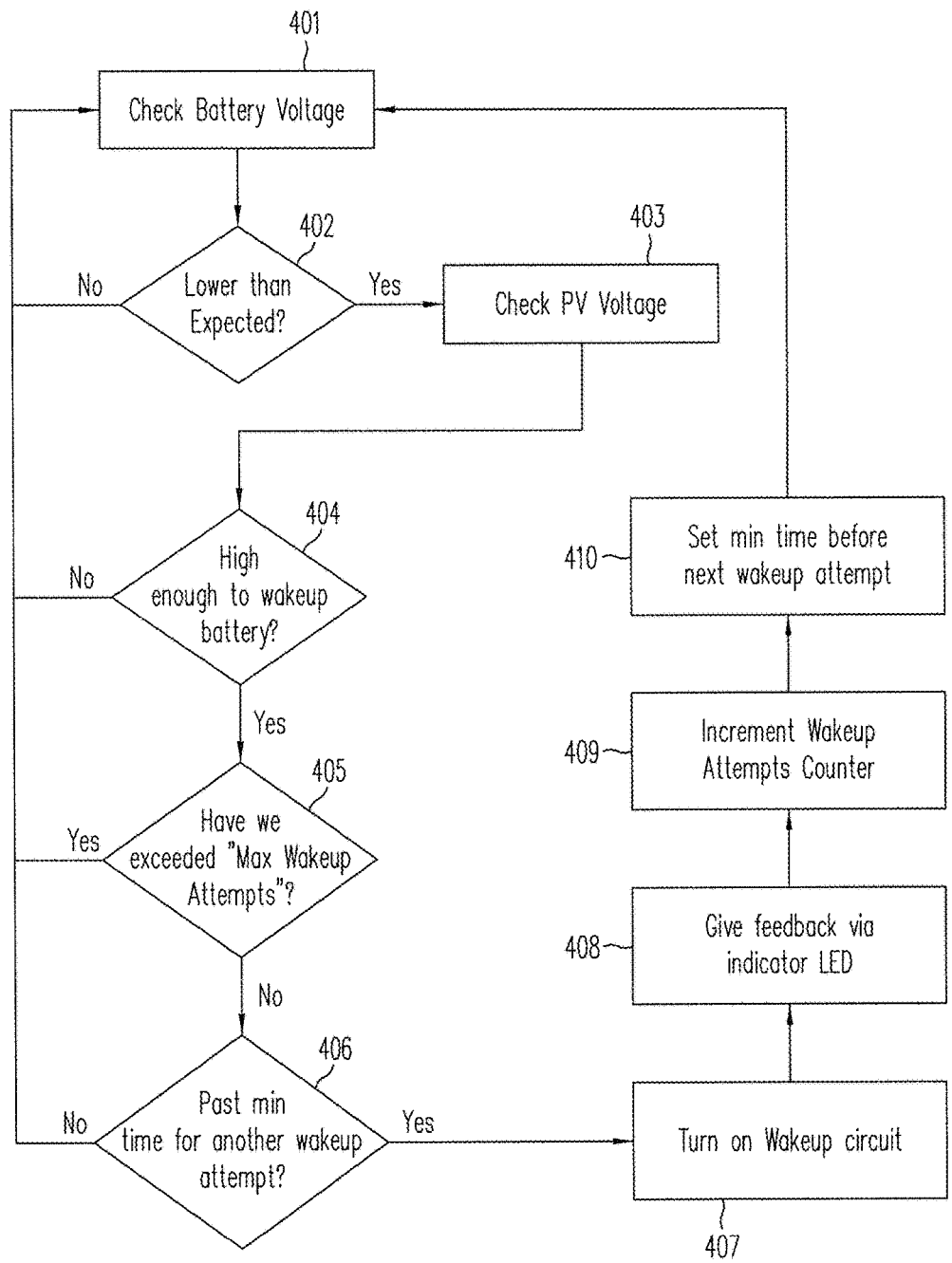
FIG. 4 illustrates a method executed in CPU 270 for asserting control signal 212, which activates battery charging circuit 201, in accordance with one embodiment of the present invention.

FIGS. 2(a1), 2(a2), 2(a3) and 2(b) show smart box circuit 200 in further detail schematically, in accordance with one embodiment of the present invention. FIG. 2(b) shows a programmable controller in circuit 200 which is implemented using central processing unit (CPU) 270. FIG. 2(a1), 2(a2), 2(a3) shows the remainder of circuit 200, including lithium battery wakeup circuit 201, secondary load circuit 251 and auxiliary input circuit 275. As shown in FIG. 2(a), battery wakeup circuit 201 is activated by control signal 212 (when conditions illustrated by flow chart 400 of FIG. 4 are met).

As shown in FIG. 2(b), after appropriate low pass filtering, CPU 270 receives sensing signals from (i) the batteries (at terminal 213), (ii) solar panels (at terminal 211), (iii load circuit 251 (at terminal 261) and auxiliary input circuit 275 (at terminal 264), and sending out control signals to activate lithium battery wakeup circuit 201 (at terminal 212), the secondary load circuit (at terminal 262) and auxiliary input circuit (at terminal 263). As shown in FIGS. 2(a1), 2(a2), 2(a3), each of the sensing signals is low-pass filtered to eliminate glitches. CPU 270 may be implemented, for example, by a microcontroller, such as the ATtiny44, available from Atmel Corporation, San Jose, Calif.

Secondary load circuit 105 ("luxury loads") receives power via secondary load circuit 251 only when solar panels 101 provides an output voltage at terminal 214 that is greater than the battery voltage at terminal 215. The voltage of solar panels 101 at terminal 215 and the voltage of the battery at terminal 215 are provided to CPU 270 at terminals 211 and 213, respectively, and are used in the algorithm depicted in flowchart 500 of FIG. 5. When conditions discussed in flowchart 500 are met, secondary load circuit 251 is activated by the control signal from CPU 270 at terminal 262, thereby enabling power to become available to circuit 105 (FIG. 1).

Circuit 200 includes power circuit 280, which supplies the power necessary to operate circuit 200. As shown in FIGS. 2(a1), 2(a2), 2(a3), circuit 280 includes a buffer circuit which limits power loss over the wide range of input voltages from the solar power source. Circuit 280 may power circuit 280 from the load (terminal 216, solar panels (terminal 214), or the batteries (terminal 215).

Auxiliary circuit 275, which is activated by a control signal at terminal 263 from CPU 270, switches auxiliary loads as needed. Auxiliary sensing signal at terminal 217 may be an external input signal to circuit 200, which may be used in conjunction with or separately from auxiliary load circuit 275, as needed.

Figure 3A:
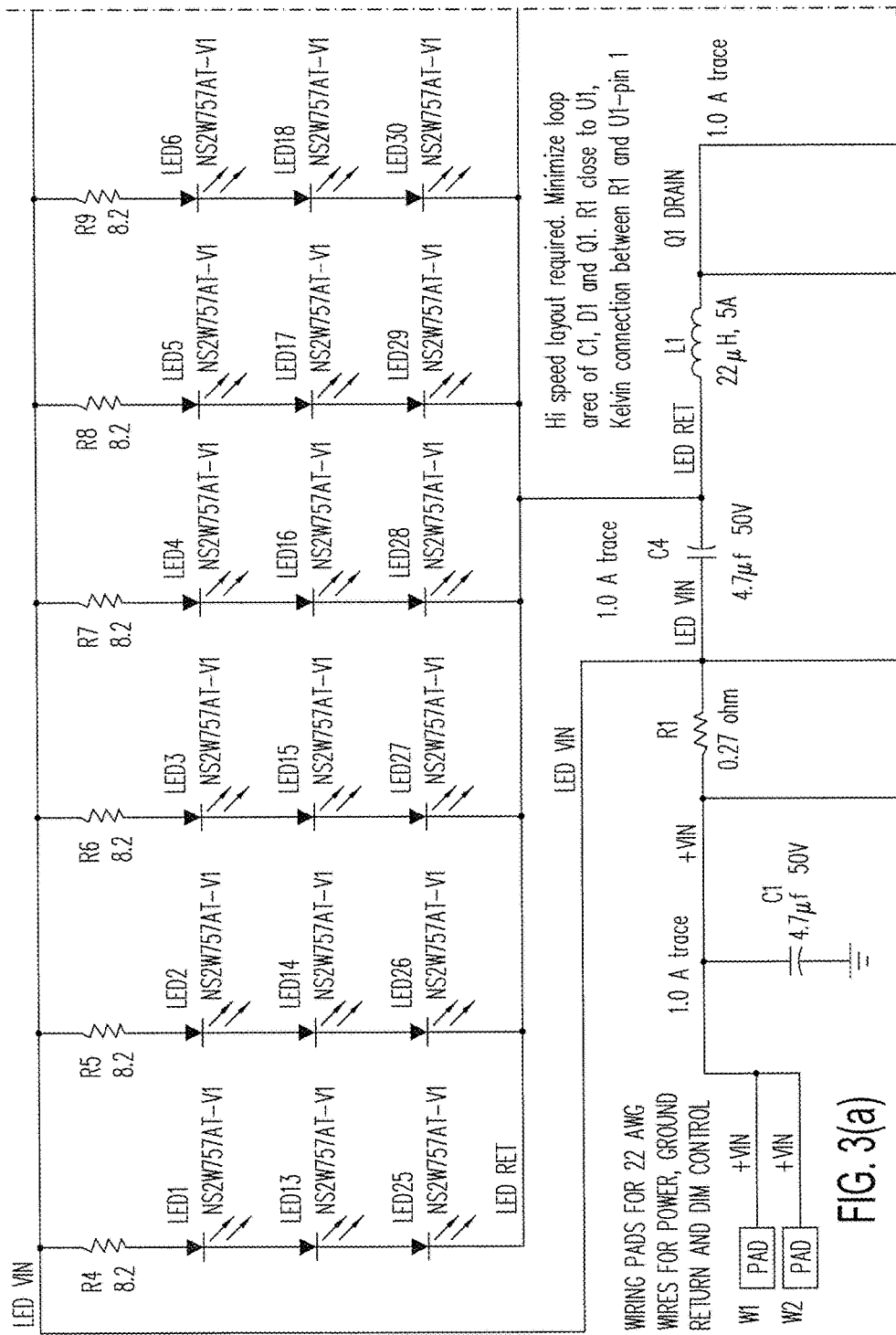
FIGS. 3(a), 3(b) and 3(c) show circuit 300, which represents an LED light that can be actively dimmed under computer control, in accordance with one embodiment of the present invention.
Figure 3B:
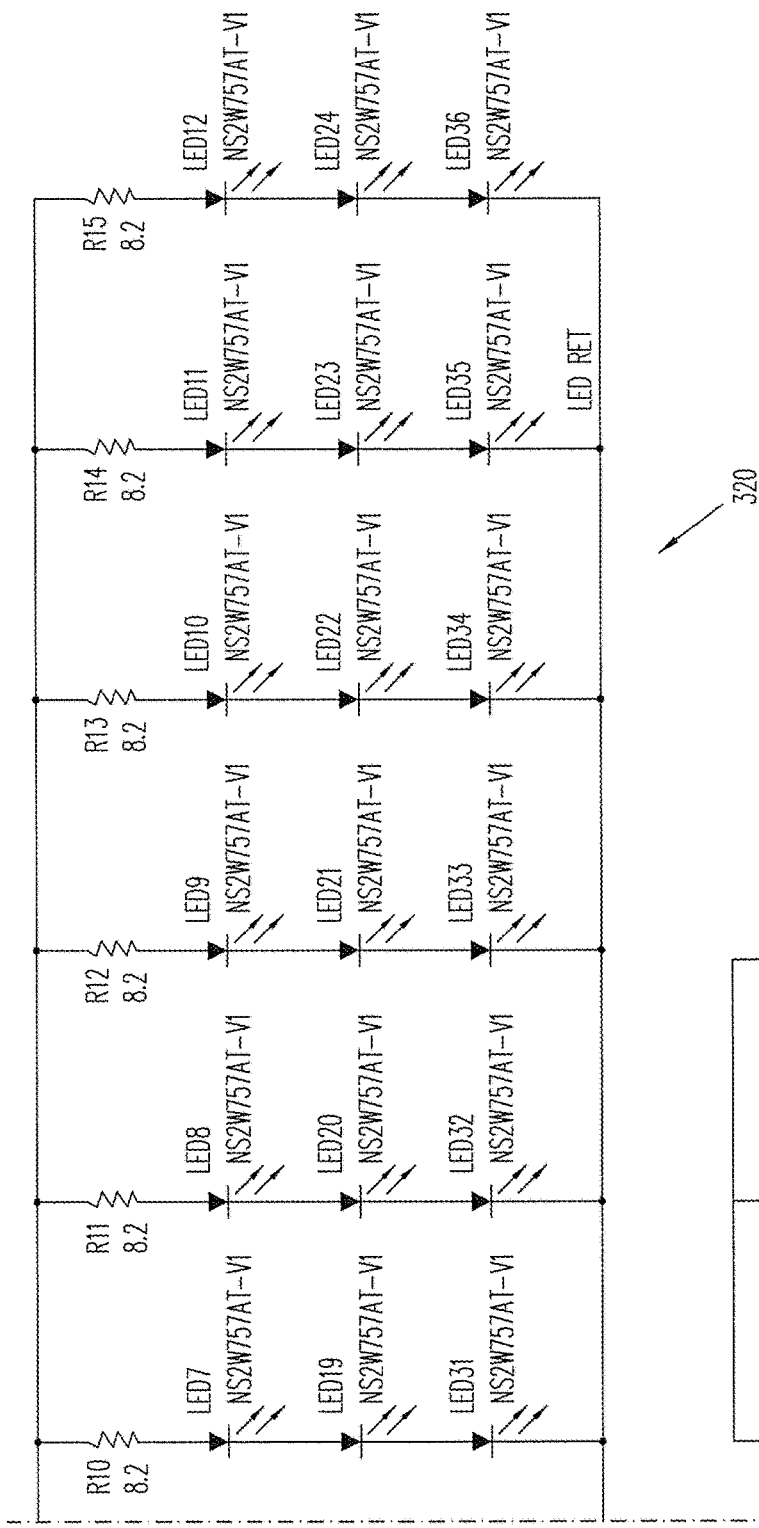
Figure 3C:
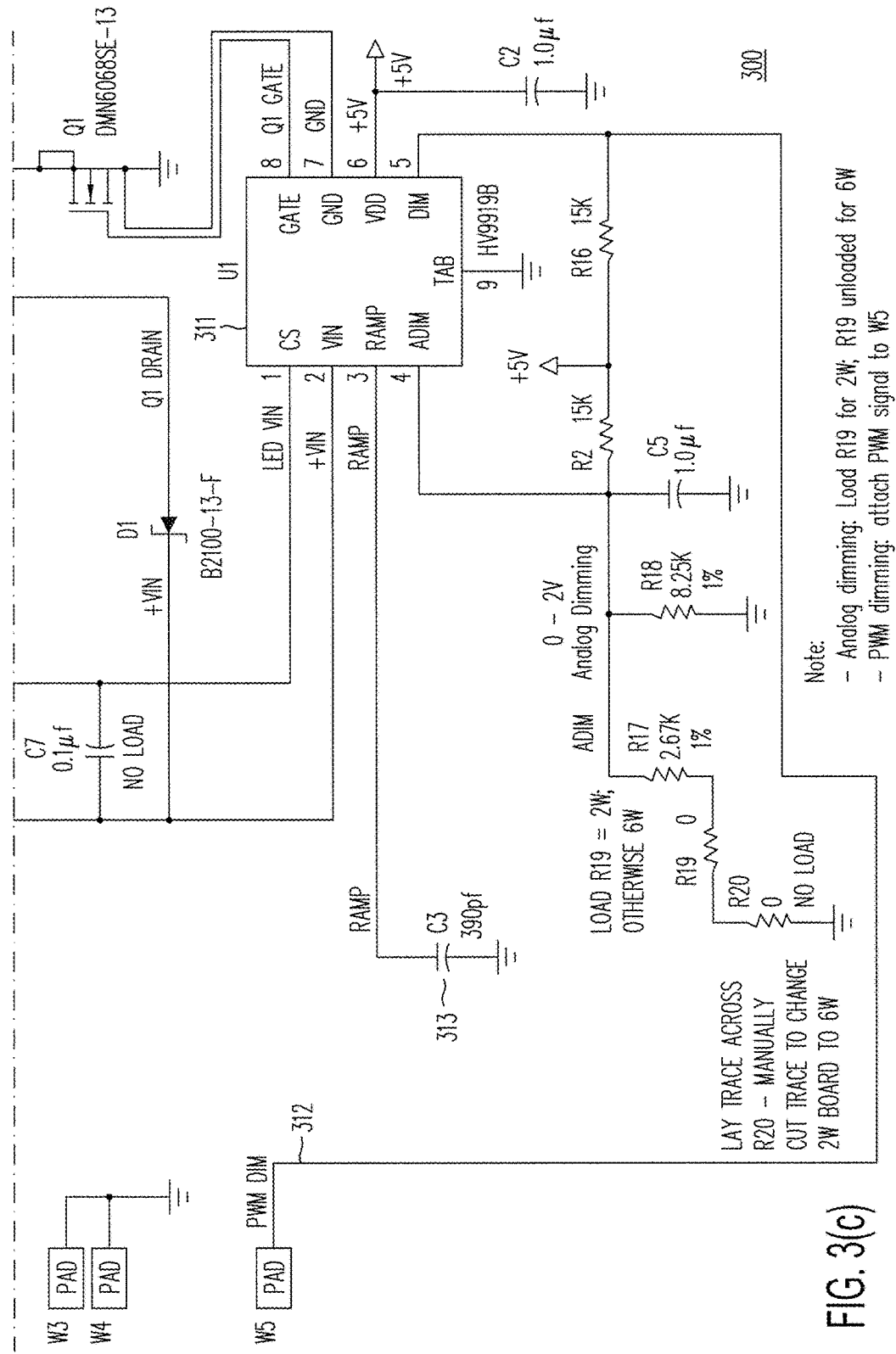

According to one embodiment of the present invention, an LED light that can be actively dimmed to under computer control may be provided, as illustrated by circuit 300 FIGS. 3(a), 3(b) and 3(c). As shown in FIGS. 3(a), 3(b) and 3(c), circuit 300 includes an array of LEDs 310 being controlled by high-brightness LED driver 311. High-brightness LED driver 311 may be provided, for example, by a high-brightness LED driver integrated circuit, such as the HV9919, available from Supertex Inc., Sunnyvale Calif., High-brightness LED driver 311 receives a pulse-width modulated (PWM) control signal at terminal 312 whose duty cycles control the brightness of LED 310. In addition, high-brightness LED driver 311 can be programmed using resistors R17, R18, R19, and R20 to provide a minimum brightness. CPU 270 may be programmed to provide the PWM controls signal at terminal 312.

Figure 6B:
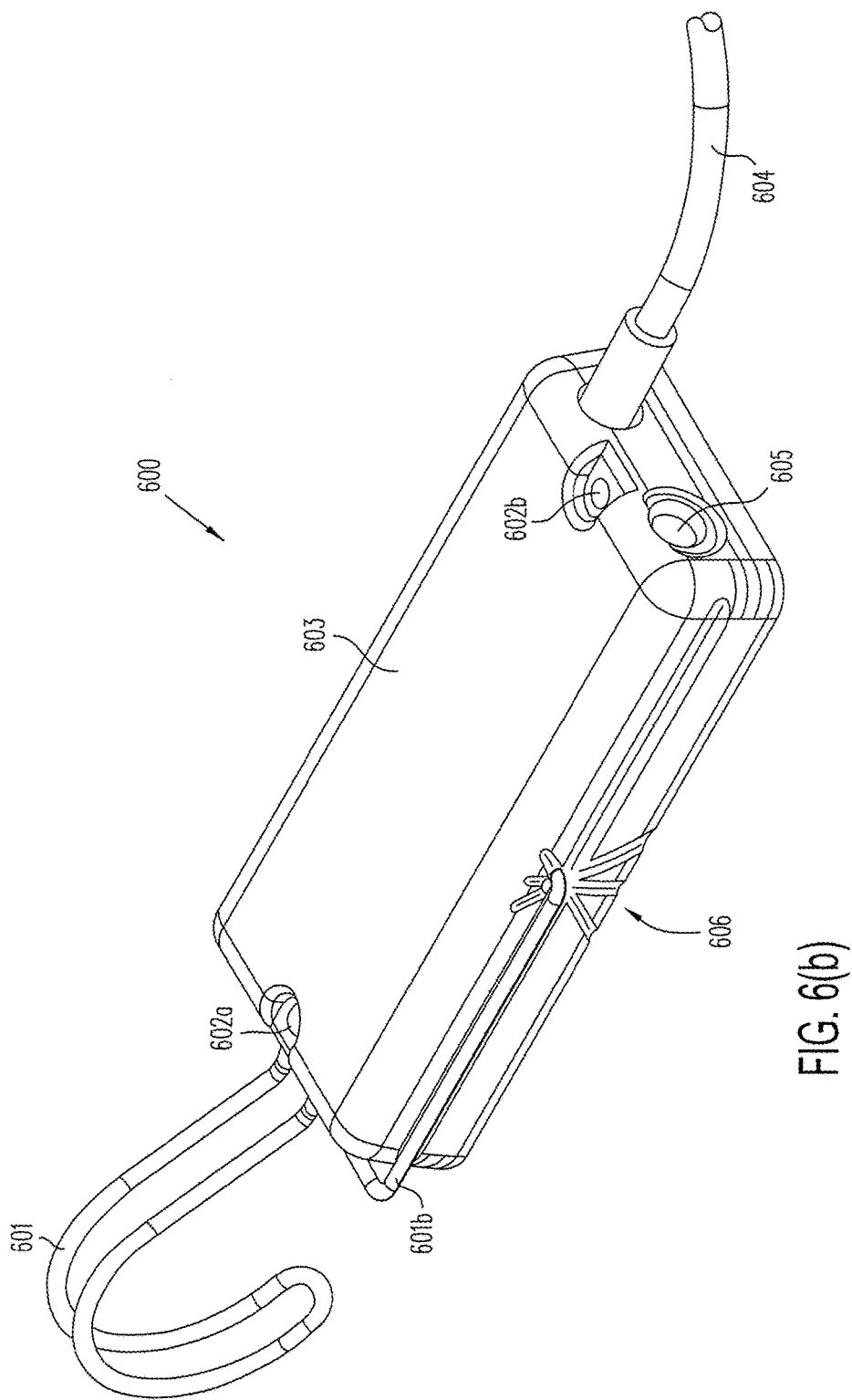
Figure 6C:
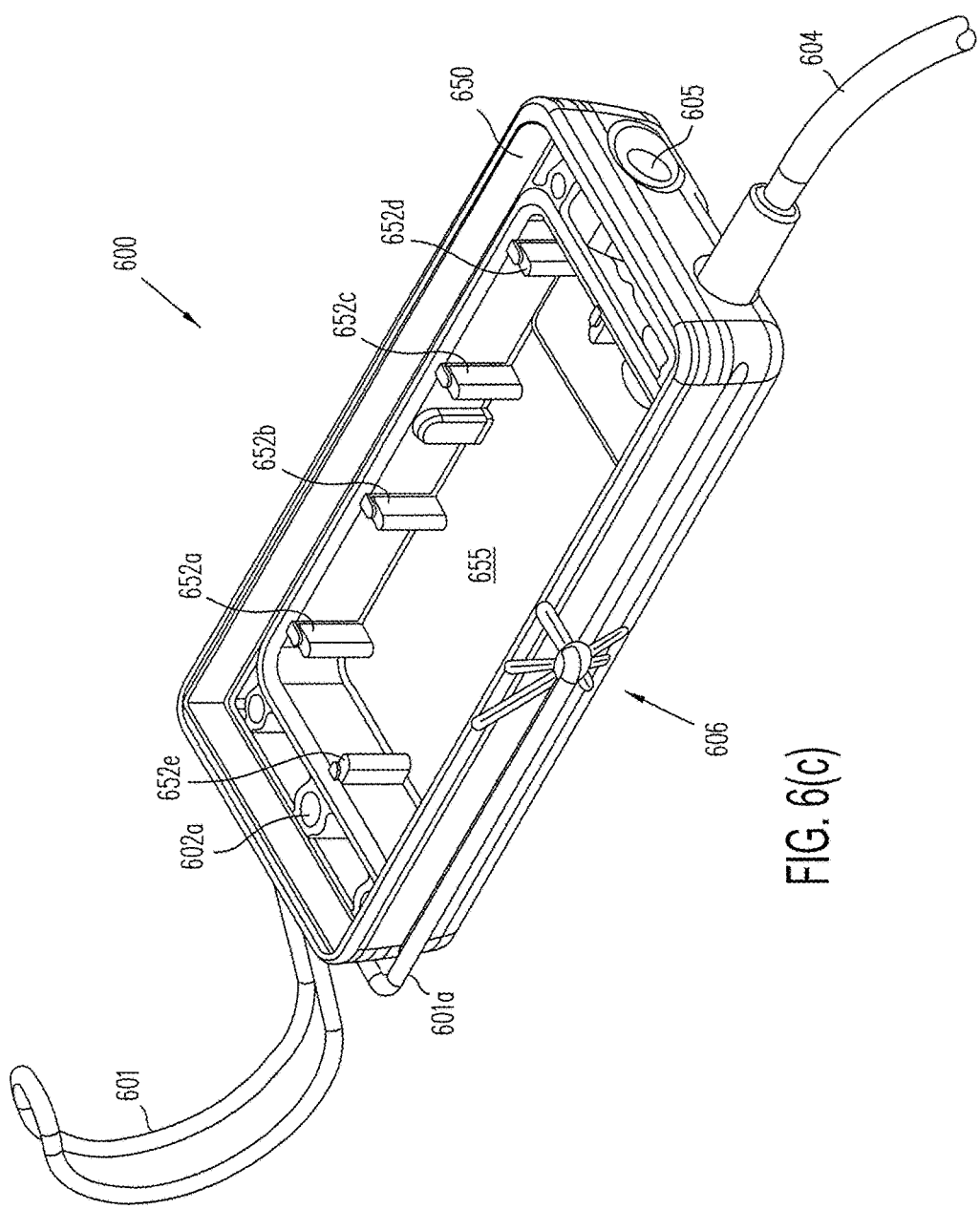
FIG. 6(c) provides the back view of housing 650 with back plate 602 and a printed circuit board (PCB) removed.
Figure 6D:
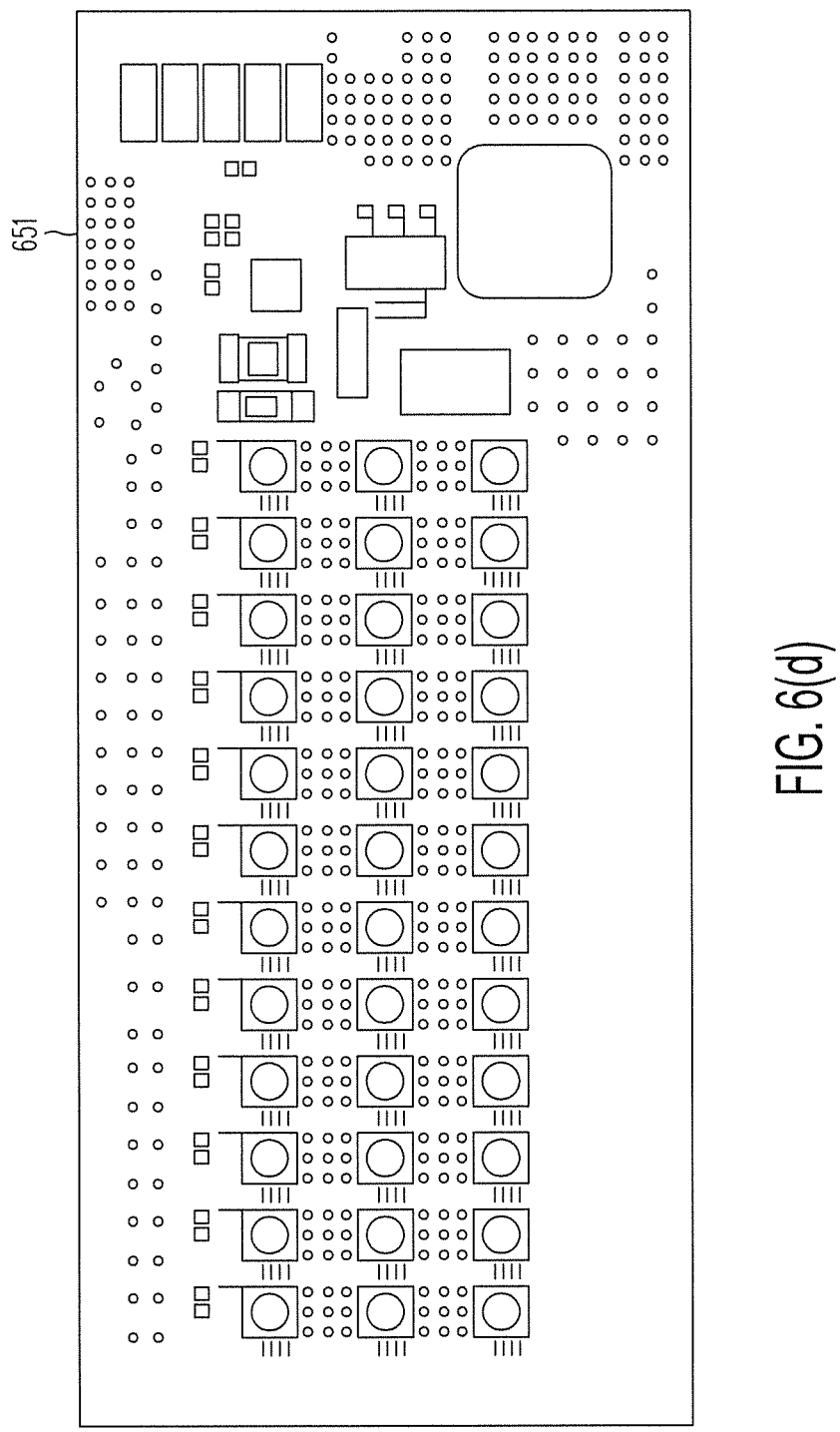
FIG. 6(d) shows PCB 651 on which numerous LED devices may be mounted; PCB 651 may be mounted on housing 650.

FIGS. 6(a) and 6(b) show, respectively, back and front views of an LED light assembly 600, according to one embodiment of the present invention. As shown in FIGS. 6(a) and 6(b), light assembly 600 includes housing 650 and hanger 601. As shown in FIG. 6(a), back plate 602 provides a covering to housing 650. Housing 650 encloses a printed circuit board (PCB) on which numerous LED devices may be mounted. One example of such a PCB is provided by PCB 651 shown in FIG. 6(d). As shown in FIG. 6(d), PCB 651 includes, for example, a 3×12 array of LED devices, together with circuitry for driving the LEDs. PCB 651 may implement, for example, circuit 300 of FIG. 3. Cable assembly 604 electrically connects PCB 651 to circuit 151 of FIG. 1(a) via a through-hole in housing 650. FIG. 6(c) provides the back view of housing 650 with back plate 602 and PCB 651 removed. As shown in FIG. 6(c), housing 650 includes cavity 655 for accommodating PCB 651, with set-offs 652a-652d for mounting PCB 651. Back plate 602 may be a thermally conductive plate (e.g., anodized aluminum), which is designed to contact PCB 651 (e.g., press against a surface of PCB 651) to allow heat from the electronics and the LED devices to dissipate through back plate 602. As shown in FIG. 6(a), back plate 602 is formed with heat sink features (e.g., the parallel raised portions or ridges) to provide increased surface area, so as to facilitate heat dissipation. In one embodiment, front surface 603 is integrally formed on housing 650 using a clear material (e.g., acrylic glass), so that front surface 603 may act as a lens for projection of light from the LED devices in the direction where illumination is desired. A proper treatment of front surface 603 may provide uniform and diffused light from the LED devices. Housing 650 includes through holes 602a and 602b, so that housing 650 may be fixedly mounted on a flat surface, such as a ceiling. Housing 650 also includes threaded hole 605 to allow housing 650 to be screw-mounted in a number of ways, such a tripod or clamped on to a table top via a "clamp and flexible goose-neck" assembly.

Figure 6E:
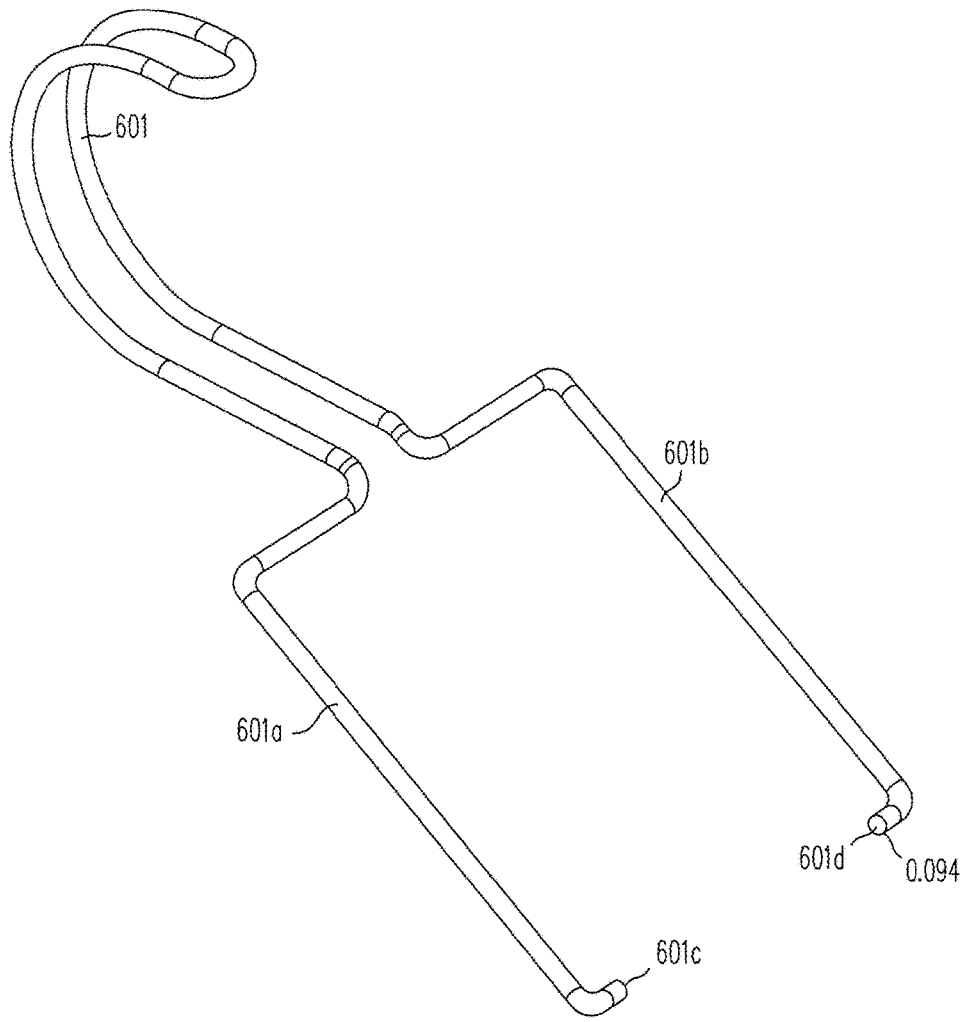
FIG. 6(e) shows hanger 601 by itself.
Figure 6F:
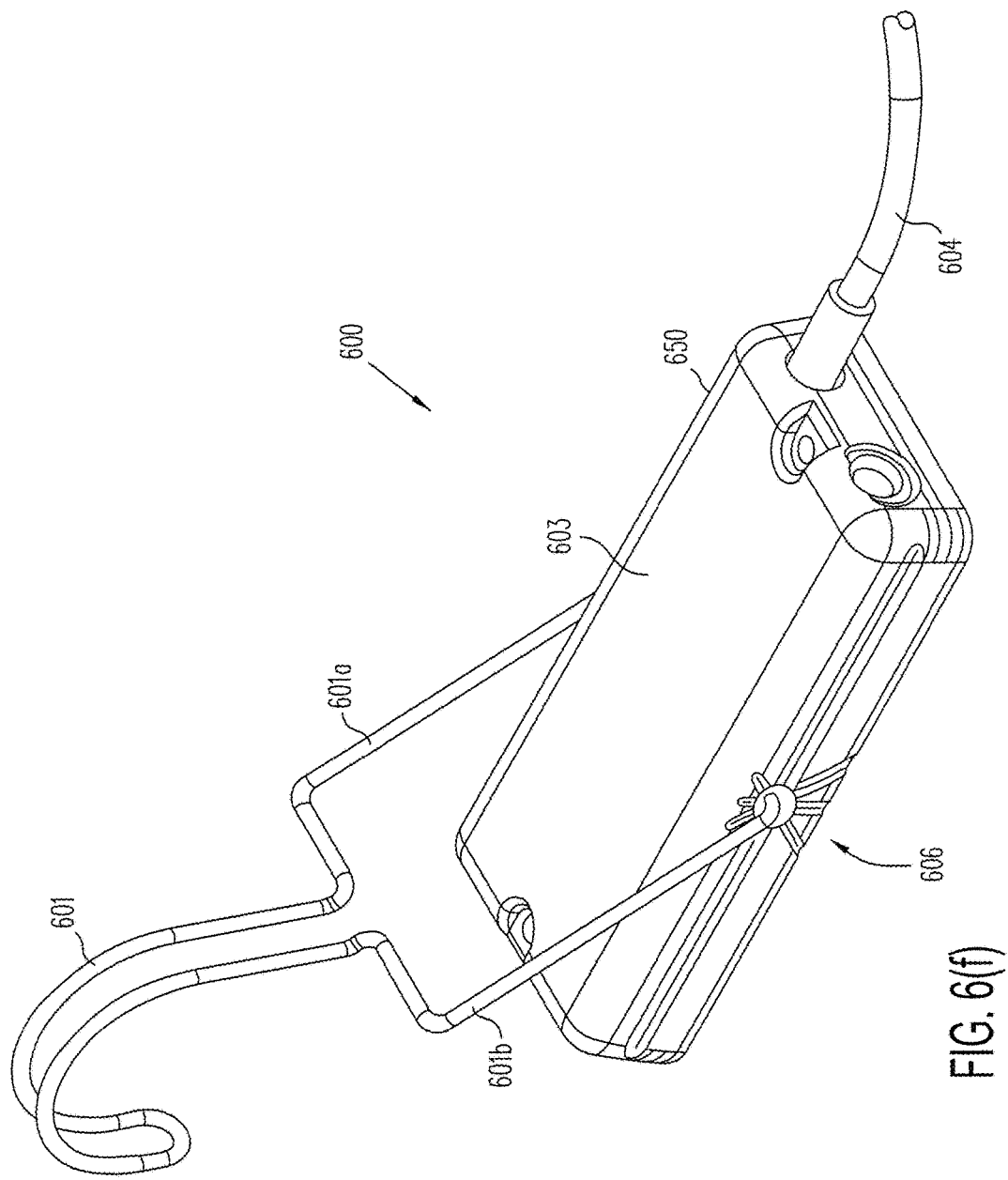
FIG. 6(f) shows housing 650 being fixed to one of the groves in pattern 606, with back surface 603 forming a 45° angle relative to arms 601a and 601b.

As shown in FIGS. 6(a) and 6(b), housing 650 is attached to hanger 601, which is independently shown in FIG. 6(e). Hanger 601 allows LED assembly 600 to be relatively portable and be hung at any suitable height to provide illumination. As shown in FIG. 6(e), hanger 601 includes a curved portion for attachment to, for example, a horizontal hanger bar. Hanger 601 also includes arms 601a and 601b which extend to elbow portions 601c and 601d, respectively. Elbows 601c and 601d are designed to be inserted into corresponding openings provided on opposite sides of housing 650, as shown in FIGS. 6(a) and 6(b). In hanger 601's relaxed state, i.e., when not attached to housing 650, the distance between arms 601a and 601b at elbows 601c and 601d is slightly less than the distance between these openings of housing 650. Radiating from the openings on housing 650 where elbows 601c and 601d are to be attached is a pattern of groves. In FIGS. 6(a) and 6(b), the groves are labeled pattern 606. Each grove in pattern 606 is designed to accommodate one of the arms 601a and 601b. For example, when arms 601a and 601b are formed with a circular cross section, each grove is formed with a semi-circular cross section with a diameter matching the diameter of arms 601a and 601b. (Arms 601a and 601b need not have a circular cross section). To attach hanger 601 to housing 650, arms 601a and 601b are pulled apart slightly to insert elbows 601c and 601d into the corresponding openings on housing 650, so that a spring action in arms 601a and 601b provides a compressive force to secure arms 601a and 601b to their respective groves on housing 650, and thereby to lock housing 650 to a fixed position suitable for providing illumination from a desired angle. As shown in FIGS. 6(a) and 6(b), pattern 606 includes groves that are 45° apart, so that housing 650 may be fixed at any of eight different positions. For example, FIG. 6(f) shows housing 650 being fixed to one of the groves in pattern 606, with front surface 603 forming a 45° angle relative to arms 601a and 601b.

As mentioned above, FIG. 4 shows a method which recovers from over-discharge of the battery. When a lithium ion battery pack is fully discharged, a conventional charging circuit may fail to recharge the battery. This is a situation frequently seen in an off-grid solar power system. Accordingly, circuit 200 has built-in lithium ion battery waking up circuit 201 that allows circuit 200 to run on either battery power or solar power. When the lithium ion battery is fully depleted and is unable to be charged by the conventional charging circuit under control of controller 102, battery ion waking-up circuit 201 is energized to allow solar power to flow into the battery pack, until normal solar charging can resume.

As shown in FIG. 4, step 401 represents a monitoring step in which the battery's voltage is checked. At step 402, if the battery's voltage is found to have dropped below a predetermined threshold (e.g., 3 volts), the voltage at the output terminal of solar panels 101 is checked at step 403. If the voltage at the output terminal of solar panels 101 is found to be sufficiently high (i.e., exceeding a threshold above which battery charging is feasible), the method proceeds to step 405. Otherwise, the wake-up procedure is postponed until the next time the battery voltage is checked at step 401. At step 405, a "wake up attempt" counter is checked to determine if the battery has undergone more than a maximum number of wake-up attempts. (This maximum number is set to a value that should not be reached under normal usage conditions). If the battery has not reached this maximum number of wake-up attempts, the elapsed time since the last wake-up attempt is checked at step 406. A battery fault condition is indicated if the elapsed time between wake-up attempts is too short (i.e., the battery's voltage is dropping too quickly to the over-discharged state). The elapsed time may be determined, for example, from a down-counter set at the end of the last wake-up attempt. If the fault condition is not indicated, i.e., the down-counter has not reached zero, the wake-up procedure is initiated to bring the battery to the boosted voltage. Activation of the wake-up procedure is indicated by an LED controlled by circuit 200 at step 408. At step 409, the wake up attempt counter is incremented to account for the current attempt. At step 410, the down-counter is set at the minimum elapsed time between wake-up attempts.

Figure 5:
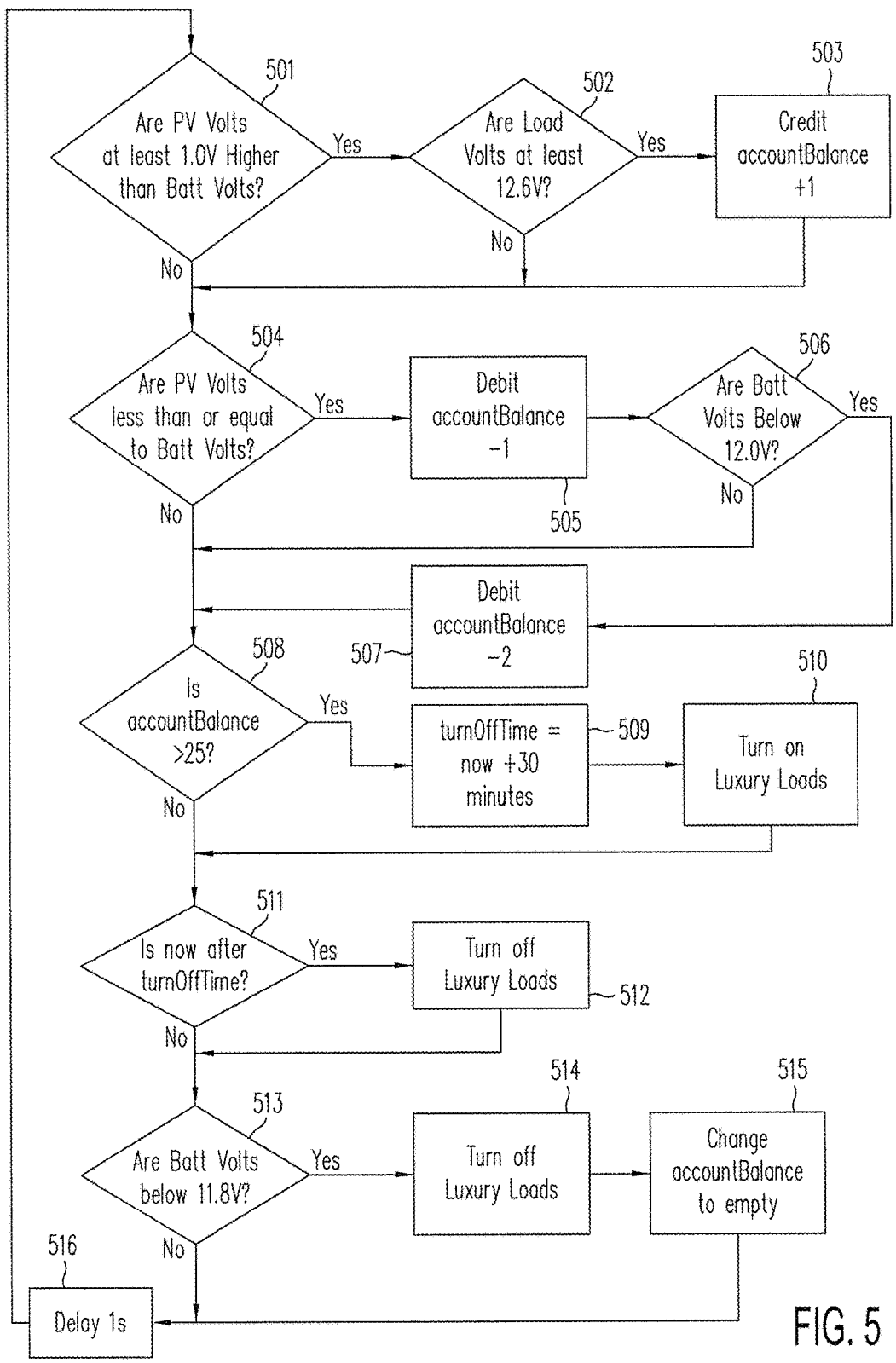
FIG. 5 illustrates a method for ensuring priority is given to using the battery's energy to provide lighting, in accordance with one embodiment of the present invention.

To ensure priority is given to using the battery's energy to provide lighting, a method that is based on a "power credit" system is provided in accordance with one embodiment of the present invention. This method is illustrated by flow chart 500 in FIG. 5. As shown in FIG. 5, at step 501, the solar panel's output voltage is checked to determine if it is at least one volt higher than the battery's voltage. The higher solar panel voltage—a favorable condition—indicates that battery charging is complete or nearly complete. If the solar panel voltage is favorable, at step 502, the voltage across the load is checked if it is at least a predetermined value (e.g., 12.6 volts). This ensures that the battery is full or nearly full. Under that condition, at step 503, a small value (e.g., 1) is added to a power credit account to indicate the favorable energy condition.

Next, step 504 determines if the solar panel voltage is actually less than the battery voltage. If so, a small value (e.g., 1) is deducted from the power credit account. At step 506, if the battery voltage is also less than, for example, 12 volts, a greater value (e.g., 2) is deducted from the power credit account.

At step 508, the power account balance is checked to see if there is sufficient power credit to allow non-lighting applications. For example, to allow non-lighting applications, the power credit account must have a value exceeding 25. At steps 509 and 510, the circuit supplying the non-lighting applications ("the luxury circuit") is activated for a predetermined time period (e.g., 30 minutes). Steps 511 and 512 deactivate secondary load circuit 251 at the end of the predetermined time period. At any time during the predetermined time period, step 513 determines if the battery voltage falls below a predetermined threshold (e.g., 11.5 volts). If so, secondary load circuit 251 is also deactivated (step 514) and the power credit account is set to zero (step 515), as the rapid battery voltage drop indicates an unfavorable condition. After a period of delay (e.g., one second, at step 516), the method returns to step 501.

In one embodiment, a power management system of the present invention may provide at least 350 watt-hours (wh) of power per day and up to about 600 wh per day. In one embodiment, one configuration of a power management system of the present invention may be, for example:

TABLE I

|  | Descriptive power consumption | Daytime energy | Night time energy (wh) |
|---|---|---|---|
| Lights | 2 lights-300 lumens-12 hours per night 1 light-100 lumens-12 | 32 | 132 wh |
| Computer | 1 computer fully charged per day | 100 | 0 |
| Tablet | 1 tablet fully charged per day | 30 | |
| Cell phones daytime | 5 dumb phones (5 wh) + 2 smart phones (15 wh) charged per day | 55 | |
| Cell phones nighttime | 2 dumb phone | 0 | 10 wh |
| Fetal Doppler | Device charged for 3 uses per day; 30 minutes total | 2 | |
| Headlamps | Rechargeable daily-use 2 Headlamps (total) (full battery | 20 | |
| Total | | 239 wh | 142 wh |

The power management system of the present invention requires little to no understanding by the user of the operation of a solar energy system, as key visual indicators are provided to inform the user whether or not the system is functioning properly and the level of power available. In addition, with the sensing signals provided to the controller, the controller can be easily programmed to provide a real time estimate of how much power remains at the current rate of power usage. The ability of a controller of the present invention to automatically vary the brightness of the lighting based on the instant power condition through the dimmer circuits allows efficient management of available power.

The above detailed description is provided to illustrate specific embodiments of the present invention and is not intended to be limiting. Numerous modifications and variations within the scope of the present invention are possible. The present invention is set forth in the accompanying claims.

The invention claimed is:

1. A power management system, comprising:
   a solar panel interface to one or more solar panels, the solar panel interface comprising wiring for: (a) receiving solar panel sensing signal representative of a voltage in the solar panels and (b) conducting one or more electrical currents received from the solar panels;
   an energy storage interface to one or more energy storage devices, the energy storage interface comprising wiring for: (a) receiving an energy storage sensing signal representative of a voltage in the energy storage devices and (b) conducting one or more electrical currents received from or provided to the energy storage devices;
   a charging circuit which routes the electrical currents from the solar panels to the wiring for conducting electrical currents received from or provided to the energy storage devices;
   a load interface to a plurality of load devices, each load device being connected to either a primary load circuit or a secondary load circuit, the load interface comprising wiring for: (a) receiving a load sensing signal representative of a voltage in the load devices and (b) conducting electrical currents to the primary load circuit and to the secondary load circuit;
   a controller for operating the solar panel interface, the energy storage interface, the charging circuit and the load interface,
   a programmable controller which executes a method for waking up the one or more energy storage devices, wherein the method performs a wake-up operation on the one or more energy storage devices when an elapsed time between the wake-up operation and an immediately preceding wake-up operation exceeds a predetermined time period; and
   a secondary load control circuit which routes the electrical currents from the energy storage devices to the wiring for conducting electrical signals in the load interface, the secondary load control circuit being capable of activating or deactivating the secondary load circuit independently of the primary load circuit.

2. The power management system of claim 1, wherein the programmable controller receives the solar panel sensing signal, the energy storage sensing signal and the load sensing signal, and wherein the programmable controller directs the secondary load control circuit to activate or deactivate the secondary load circuit based on the solar panel sensing signal, the energy storage sensing signal and the load sensing signal.

3. The power management system of claim 1, further comprising a lithium ion battery wake-up circuit.

4. The power management system of claim 1, further comprising a housing for enclosing the solar panel interface, the energy storage interface, the charging circuit, the load interface, the secondary load control circuit, the programmable controller, at least one of the solar panels and at least one of the energy storage devices.

5. The power management system of claim 4, wherein the secondary load control circuit and the programmable controller are provided as an optional plug-in module.

6. The power management system of claim 1, wherein the power management system is portable.

7. The power management system of claim 1, wherein the energy storage devices include one or more lead acid batteries.

8. The power management system of claim 1, wherein the energy storage devices comprises a battery based on lithium ions.

9. The power management system of claim 1, wherein the method performs a wake-up operation on the battery when the solar panel sensing signal and battery sensing signals indicate voltages suitable for performing a charging operation on the battery.

10. The power management system of claim 1, wherein the method performs a wake-up operation on the battery when previous wake-up operations have not exceed a predetermined maximum number.

11. The power management system of claim 1, wherein the secondary load control circuit comprises a low-dropout voltage regulator for supplying a regulated voltage to control circuitry.

12. The power management system of claim 1, wherein the programmable controller maintains a score relevant to determining whether to activate or to deactivate the secondary load circuit.

13. The power management system of claim 12, wherein the programmable controller increases the score when the solar panel sensing signal and the load sensing signal both indicate a favorable power condition.

14. The power management system of claim 12, wherein the programmable controller decreases the score when the solar panel sensing signal and the energy storage sensing signal together indicate an unfavorable condition for charging the energy storage devices.

15. The power management system of claim 14, wherein the programmable controller further decreases the score when the energy storage sensing signal indicates that the energy stored in the energy storage devices is less than a predetermined value.

16. The power management system of claim 12, wherein the secondary load circuit is activated when the score exceeds a predetermined value.

17. The power management system of claim 16, wherein the secondary load circuit is activated for a predetermined time period.

18. The power management system of claim 16, wherein the secondary load circuit is deactivated when the energy storage sensing signal indicates that the energy stored in the energy storage devices is less than a predetermined value.

19. The power management system of claim 18, wherein the score is set to zero upon deactivating the secondary load circuit.

20. The power management system of claim 1, further comprising one or more light emitting diode-based (LED) lights operating on the primary load circuit.

21. The power management system of claim 20, wherein each of the LED lights is capable of being dimmed in response to a control signal from the programmable controller.

22. The power management system of claim 20, wherein each of the LED lights is capable of being programmed to be dimmed to a predetermined minimum brightness.

23. The power management system of claim 20, wherein each LED light is dimmed by an amount related to a duty cycle of the control signal.

24. The power management system of claim 23, wherein the programmable controller determines the duty cycle of the control signal in response to the solar panel sensing signal, the energy storage sensing signal and the load sensing signal.

\* \* \* \* \*